United States Patent

Freise et al.

[11] Patent Number: 5,280,211
[45] Date of Patent: Jan. 18, 1994

[54] MOTOR AND/OR GENERATOR OPERATING ACCORDING TO THE RELUCTANCE PRINCIPLE

[75] Inventors: Werner Freise, Kaiserslautern; Helmut Schmidt, Reichenberg; Wolfgang Weinhold, Würzburg; Udo Winter, Kürnach; Klaus Zaps, Astheim, all of Fed. Rep. of Germany

[73] Assignee: Siemens Aktiengesellschaft, Munich, Fed. Rep. of Germany

[21] Appl. No.: 849,000
[22] PCT Filed: Feb. 15, 1991
[86] PCT No.: PCT/EP90/00302
    § 371 Date: Apr. 17, 1992
    § 102(e) Date: Apr. 17, 1992
[87] PCT Pub. No.: WO92/07411
    PCT Pub. Date: Apr. 30, 1992

[30] Foreign Application Priority Data

Oct. 22, 1990 [EP] European Pat. Off. ........ 90120220.0

[51] Int. Cl.⁵ ............................................. H02K 17/42
[52] U.S. Cl. .................................. 310/168; 310/112; 310/154; 310/179; 310/258; 318/701
[58] Field of Search ............... 310/154, 42, 254, 166, 310/168, 163, 106, 179, 91, 180, 259, 181, 218, 162, 112, 164, 165, 158, 155; 318/701; 322/47, 50

[56] References Cited

U.S. PATENT DOCUMENTS

| | | | |
|---|---|---|---|
| 2,487,688 | 11/1949 | Bishofberger | 310/112 |
| 2,993,134 | 7/1961 | Harvey | 310/181 |
| 3,156,840 | 11/1964 | Clothier | 310/259 |
| 3,221,195 | 11/1965 | Hoffmann | 310/179 |
| 3,789,252 | 1/1974 | Abegg | 310/259 |
| 3,970,979 | 7/1976 | Montagu | 310/168 |
| 4,206,374 | 6/1980 | Goddijin | 310/112 |
| 4,216,399 | 8/1980 | Bartheld | 310/91 |
| 4,550,280 | 10/1985 | Freise | 318/701 |
| 4,584,513 | 4/1986 | Freise et al. | 318/701 |
| 4,795,932 | 1/1989 | Long | 310/154 |
| 4,963,775 | 10/1990 | Mori | 310/181 |
| 5,214,336 | 5/1993 | Schmidt et al. | 310/254 |

FOREIGN PATENT DOCUMENTS

| | | |
|---|---|---|
| 0103821 | 11/1985 | European Pat. Off. . |
| 0726190 | 8/1942 | Fed. Rep. of Germany . |
| 2944968 | 5/1981 | Fed. Rep. of Germany . |
| 3335626 | 4/1985 | Fed. Rep. of Germany . |
| 0841103 | 5/1939 | France . |
| 1452379 | 9/1966 | France . |

Primary Examiner—R. Skudy
Attorney, Agent, or Firm—Kenyon & Kenyon

[57] ABSTRACT

In a stator-excited synchronous machine with laminated sector stator elements (SS1 or SS2), which are arranged one behind another at an axial distance and are winding-excited by in each case one excitation winding part (EW1 or EW2) of opposite polarity, the operating efficiency can be increased with low outlay when a permanent magnet arrangement (M) having a magnetization opposing the winding excitation in the sector stator elements is provided in the axial spacing chamber between the sector stator elements (SS1 or SS2); in order to lock the position of the magnet arrangement (M), the facing laminations of the magnet arrangement (M) have bent-away tongues (Z) gripping radially from below.

16 Claims, 3 Drawing Sheets

MOTOR AND/OR GENERATOR OPERATING ACCORDING TO THE RELUCTANCE PRINCIPLE

BACKGROUND OF THE INVENTION

The present invention relates to a motor and/or generator operating according to the reluctance principle and in particular, a motor and/or generator having a stator that has sector stators that are distributed over the circumference of the rotor and, are mutually magnetically separated. Each sector contains a pair of toothed sector stator elements. The pair of sector stator elements are arranged one behind the other and separated by an axial distance. Each stator sector element pair has common power windings, each ends in a radially projecting pole shank. Each pole shank can be excited in a polarity opposing the other sector stator element by an excitation winding part wrapped around it. Both pole shanks are connected radially outside by a return yoke.

A motor and/or generator operating according to the principle of the stator-excited synchronous machine of sectoral design is known from EP-B1-0,103,821.

In the configuration disclosed in that European patent document, the sector stator elements of a sector stator are mutually separated by an axial spacing chamber. The cylindrical circumferential surface of a flywheel, also used as a rotor of the motor and/or generator, especially for coupling a motor vehicle internal-combustion engine, is configured in the form of two spider wheels offset with a certain axial spacing distance.

DE-A-3,335,626 has disclosed a single-phase or multiphase a.c. machine with homopolar excitation and laminated stator cores, arranged axially one behind another. Axially magnetized magnets are inserted between the yoke arches for stray-field compensation.

SUMMARY OF THE INVENTION

The present invention increases the operating efficiency of a conventional motor and/or generator operating according to the reluctance principle, such as the type mentioned at the beginning, by preventing an undesired, large stray field. The present invention accomplishes this by arranging an axially magnetized permanent magnet arrangement comprising the yoke arches and magnet parts covering the stator teeth of a sector stator element and having a magnetization opposing the winding excitation in the sector stator elements in the axial spacing chamber between the sector stator elements of a sector stator such that its magnetic field closes, in an axial/tangential-radial fashion, the yokes of the sector stator elements, or, radially via stator teeth, the air gap and the offset rotor poles, and axially/tangentially via the rotor yoke. The magnet parts may be expediently combined to form a one-piece magnet arrangement from a sintered molded magnet.

According to a first embodiment of the present invention, the magnet arrangement consists only of a magnet part essentially covering the yoke arch of a sector stator element in each case. The design and installation of the first embodiment is particularly simple. Should this chamber be unavailable or not completely available for accommodating a magnet arrangement, according to a further embodiment of the present invention, magnet parts covering the stator teeth of a sector stator element are additionally provided. A known motor and/or generator may be greatly improved when the magnet arrangement consists of magnet parts respectively covering both the yoke arch and the stator teeth of a sector stator element. Combining the magnet parts to form a one-piece magnet arrangement from a sintered molded magnet is preferable.

In the present invention, the interaction between, on the one hand, the excitation that can be controlled by the excitation winding parts and, on the other hand, the permanent magnetization provided by the magnet arrangement permits reducing the excitation winding copper in conjunction with simple controllability of the excitation, and avoids an undesired large stray field between the end faces of the laminated cores, located axially in front of each other, of the sector stator elements.

As an example, mutually bonding the end faces of the laminated cores of the sector stator elements located in front of each other to retain the magnet arrangement in the axial spacing chamber between the adjacent end faces of the laminated cores is possible. According to one embodiment of the present invention, an additional positive lock, in particular, a means for preventing the magnet arrangement from falling down into the rotor chamber, is possible using simple structural means when the laminations facing the magnet arrangement have retaining parts simply constructed in the form of tongues which grip from under the magnet part and are bent away on the radial ends of the stator teeth from the latter.

BRIEF DESCRIPTION OF THE DRAWINGS

The present invention and further advantageous embodiments of the present invention are explained in more detail below referring to diagrammatically represented exemplary embodiments in the drawing, wherein.

DETAILED DESCRIPTION

Figure 1:
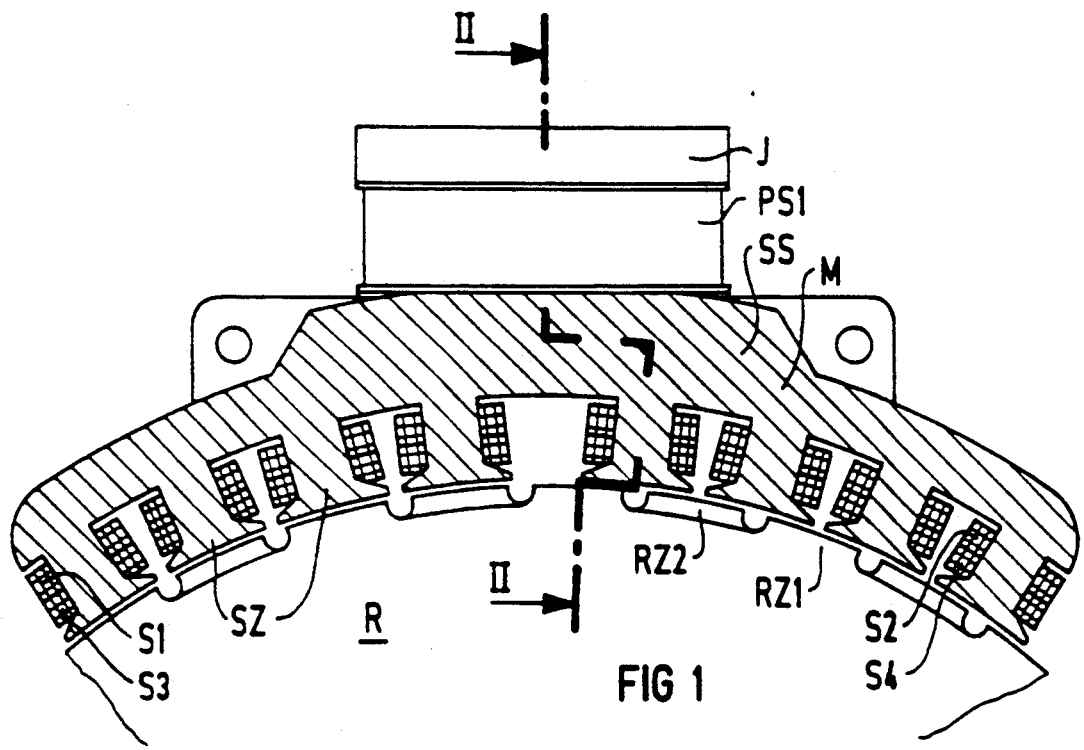
FIG. 1 shows an end-face top view of a sector stator element with a permanent magnet arrangement axially set in front, in accordance with the line of section I—I in FIG. 2.
Figure 2:
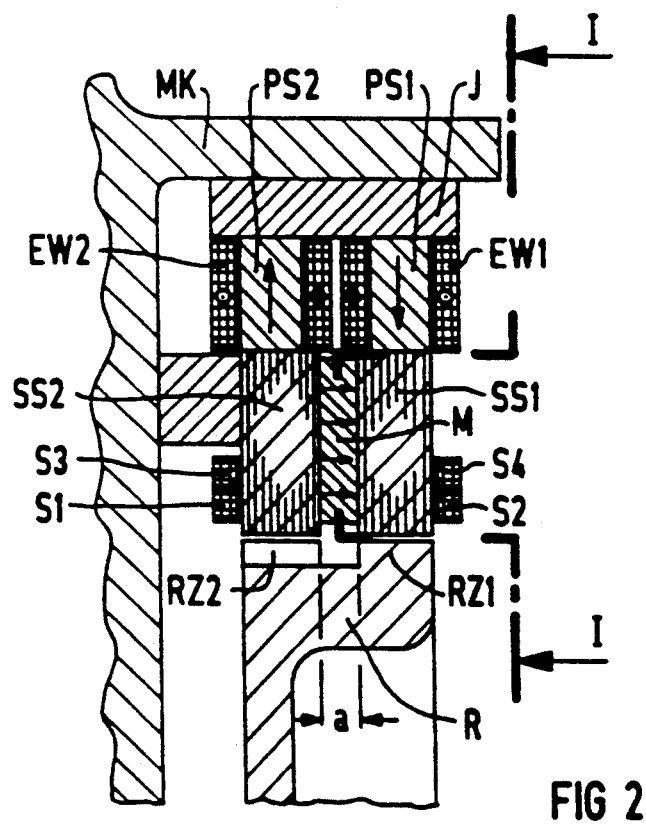
FIG. 2 shows a sector stator, installed in the internal-combustion engine of a motor vehicle, in accordance with the partial representation in FIG. 1 along the line of section II—II.

FIG. 1 shows an individual sector stator SS, in accordance with the line of section I—I in FIG. 2, mounted on the motor crank case MK of a motor vehicle internal-combustion engine and extending through a circumferential angle, for example, of approximately 70 degrees, over the flywheel of the internal-combustion engine, which is also used as rotor R. Although, in the subdivision of the poles or windings represented here, the serviceability of the motor and/or generator according to the present invention is provided per se even with only a single sector stator SS on the entire circumference, arranging sector stators in pairs at a tangential distance from one another is preferable. The sector stator pair is arranged on the circumference of the motor crank case such that each sector stator is approximately opposite to the other, and when the sector stators distributed on the circumference are electrically interconnected, the voltages induced in one phase winding in each case are co-phasal over all.

The sector stator SS, represented in FIGS. 1 and 2, contains two sector stator elements SS1 or SS2 separated by an axial distance a. Each sector stator element SS1 or SS2 has a number of, e.g., eight stator teeth SZ arranged so that they are aligned axially one behind another. A 4-phase winding having phase windings S1, S2, S3, S4 of equal coil span offset electrically with respect to one another by 90 degrees is provided as a stator power winding. In the exemplary embodiment represented here, the phase windings S1 and S3 are wound around the stator teeth of the left most group of stator teeth of the sector stator SS and the phase windings S2 and S4 are wound around the stator teeth on the right most group of stator teeth of sector stator SS such that they wrap around two stator teeth located axially one behind another.

Each sector stator element SS1 and SS2 ends in a radially projecting pole shank PS1 and PS2, respectively. A concentrated excitation winding part EW1 or EW2 is wrapped around the pole shank PS1 or PS2, respectively. These excitation winding parts are advantageously constructed as a formed coil that can be radially plugged onto a pole shank PS1 or PS2. The excitation winding parts EW1 or EW2 are connected to a controllable direct voltage so as to produce the same current direction in the two coil sides located between the sector stator elements SS1 and SS2 (see FIG. 2). The pole ends of the pole shanks PS1 and PS2 are connected to the motor crank case by a return yoke J.

The external circumference of the clutch flywheel of a motor vehicle internal-combustion engine is also used as rotor R having, on its circumference, two rows of rotor teeth RZ1 and RZ2. The rotor teeth RZ1 and RZ2 are assigned to the rows of teeth of the stator teeth SZ of the first and second sector stator elements SS1 and SS2, respectively, and have rotor teeth offset with respect to one another at an axial distance and with an axial spacing. The two rows of teeth RZ1 and RZ2 are connected in a magnetically conductive fashion since they are part of the solid iron clutch flywheel.

An axially magnetized permanent magnet arrangement M comprising a magnet part essentially covering the yoke part and a magnet part essentially covering the stator teeth SZ is provided in the axial spacing chamber between the sector stator elements SS1 and SS2. The permanent magnet arrangement M is magnetized such that it is directed oppositely to a stray field of the exciting field generated by the excitation winding parts EW1 and EW2. If the permanent magnet arrangement is not present, this stray field enters the axial spacing chamber between the sector stator elements.

If there was no exciting current in the excitation winding parts EW1 and EW2, the return via the return yoke J would reduce the magnetic potential of the permanent magnet arrangement M at the air gap between the stator teeth SZ and the rotor R, and thus also would reduce the air gap exciting field to an uncritical residual value. Designing the cross-section of the return such that it also can short-circuit the remanence flux of the permanent magnet arrangement in an almost unsaturated fashion is preferred. When the excitation winding parts EW1 and EW2 conduct current, their magnetic potential at the air gap between the stator teeth SZ and the rows of rotor teeth RZ1 and RZ2 of the rotor R becomes active at the air gap. Starting from a sufficient exciting current intensity of the excitation winding parts EW1 and EW2, the flux through the return of the return yoke J changes its sign and thereafter proceeds together with the permanent magnetic flux of the permanent magnet arrangement M as active excitation flux over the air gap.

The advantage of combining the permanent magnet excitation by the permanent magnet arrangement M, and the electrical excitation by the excitation winding parts EW1 and EW2 is illustrated by the following consideration: if the stator and/or generator had been embodied with a permanent magnet arrangement alone, the exciting field would have been invariable because of the then impermissible return between the laminated cores of the sector stator elements SS1, SS2; if the excitation were to be performed purely electrically via the excitation winding parts EW1 and EW2, a very large, undesired stray field of all the laminated cores, located axially in front of each other at a distance from one another between the end faces, of the sector stator elements SS1 and SS2 would have been produced.

Providing a bonded joint to retain the permanent magnet arrangement M between the facing end faces of the sector stator elements SS1 and SS2 is possible. To additionally secure the magnet's location between the sector stator elements SS1 and SS2, and in particular, to prevent the permanent magnet arrangement M from falling down into the rotor chamber located radially thereunder, an aspect of the present invention (as may be seen in particular from FIG. 3) allows the radial ends of the stator teeth SZ of the last laminations facing the axial spacing chamber between the sector stator elements to be bent over axially at least partially such that they provide a partial floor under the permanent magnet arrangement M as a radial lock in the form of tongues Z.

Figure 3:
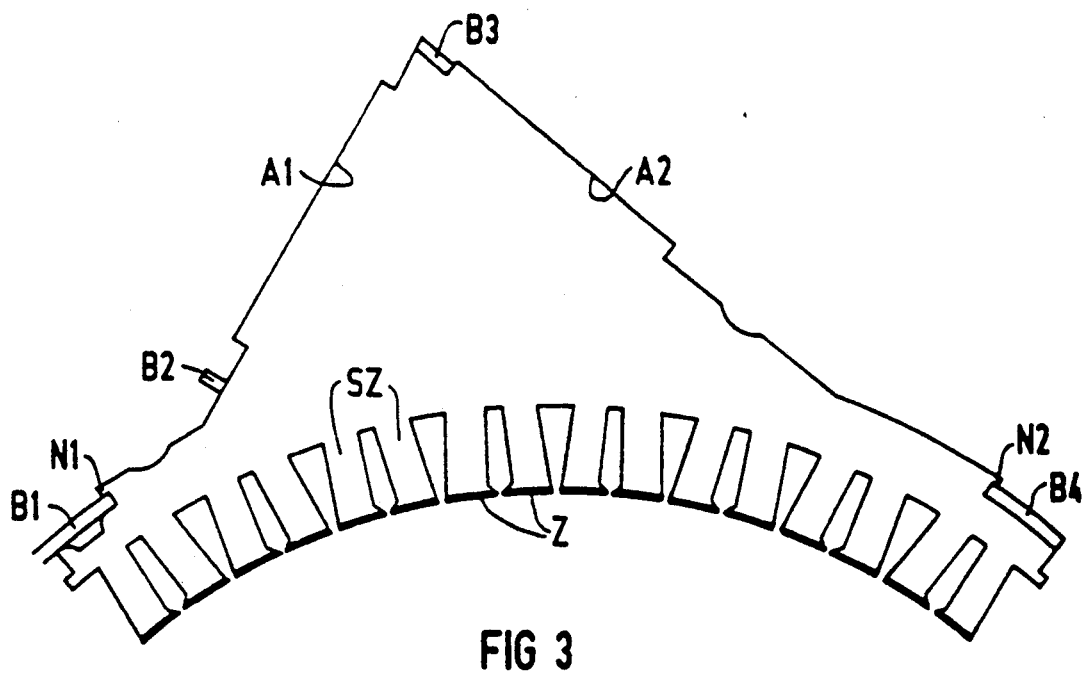
FIG. 3 shows an end face view of a lamination, with bent-away lugs, facing the permanent magnet arrangement.
Figure 4:
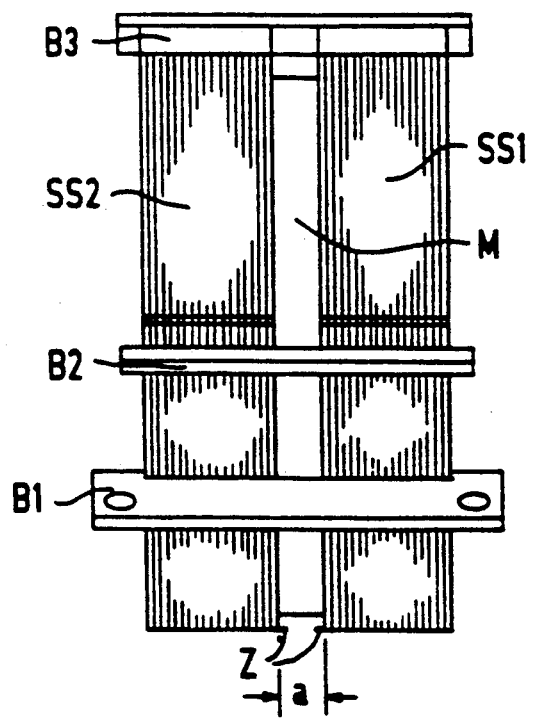
FIG. 4 shows the lateral top view of a sector stator with overlapping brackets.

Non-magnetic brackets B1-B4 which axially overlap the two sector stator elements SS1 or SS2 and are, for example, welded thereto, can serve as an additional tangential positive lock for the permanent magnet arrangement M (see FIGS. 3 and 4). In accordance with FIG. 3, the brackets B1 and B4 are overlapped radially outside by noses N1 or N2 on the sector stator elements SS1 and SS2 in an undercut fashion such that the brackets B1 and B4 mounted on the housing of the internal-combustion engine or of the clutch can also simultaneously be used as a positive lock against the sector stator elements falling down into the rotor chamber.

Figure 5:
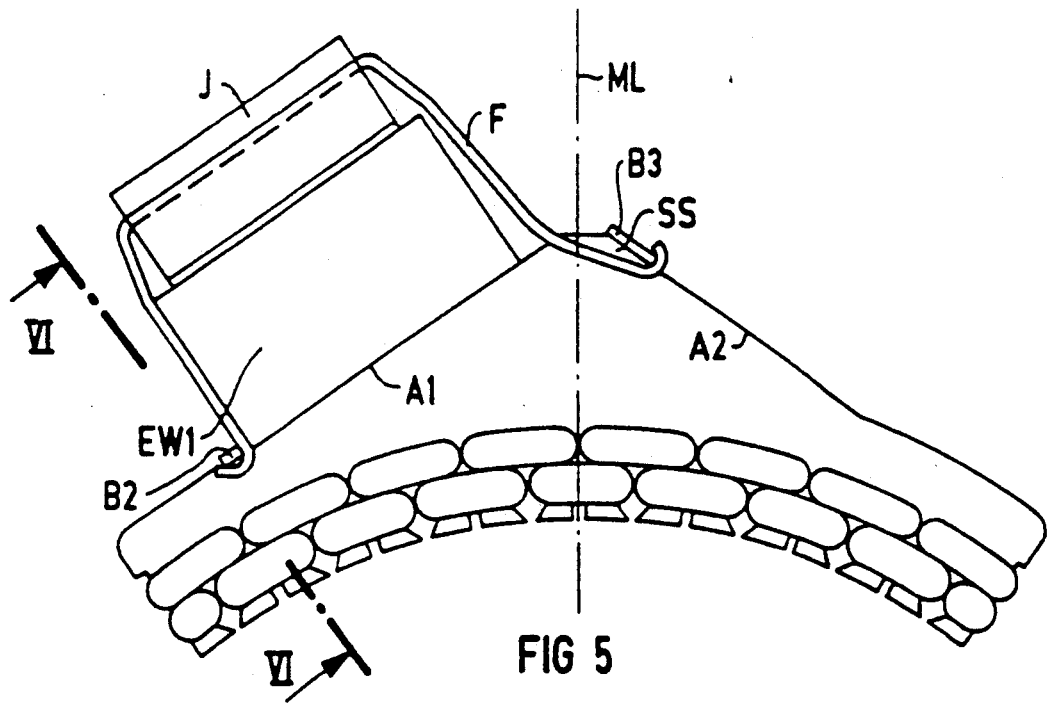
FIG. 5 shows an end-face top view of a sector stator element with a discrete pole shank offset laterally from the central line of symmetry.
Figure 6:
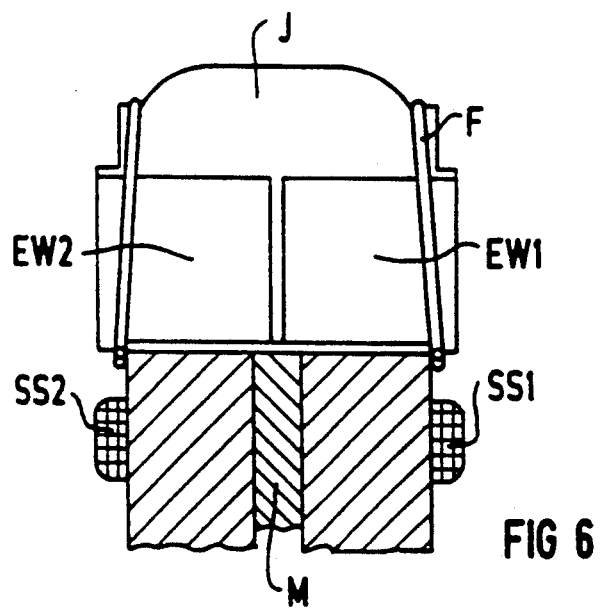
FIG. 6 shows a detail of the sector stator in accordance with FIG. 5 along the line of section VI—VI.

According to a further embodiment of the present invention, for more easily introducing the permanent magnet arrangement M between the inner end face of the sector stator elements SS1 and SS2 and at the same time advantageously reducing the overall radial height, the pole shanks PS1 and PS2 accommodating the excitation winding parts EW1 and EW2, respectively, are provided as discrete components, and arranged laterally offset from the central line of symmetry ML of a sector stator element. For this purpose, bearing surfaces A1 or A2, against which the pole shanks PS1 or PS2 can be laid and fixed, are stamped on the laminations of the sector yokes (see FIGS. 3 and 5). Bracket springs F simultaneously press the return yoke J against the pole shanks and grip with their ends located on the sector stator side around ends, projecting axially beyond the sector stator elements SS1 and SS2, of the brackets B2 and B3 respectively. The bracket springs serve to fix the pole shanks PS1 and PS2, provided with slipped-over excitation winding parts EW1 and EW2, to the sector stator elements SS1 and SS2 respectively.

Each laminated core of the sector stator elements is advantageously provided with two bearing surfaces A1 or A2, each of which can support one pole shank. The bearing surfaces are arranged according to one embodiment of the present invention with mirror symmetry relative to one another with respect to the central line of symmetry ML. Thus, adapting to different installation conditions is possible by mounting the pole shanks PS1 or PS2 with their excitation winding parts EW1 or EW2 either on the left-hand bearing surface A1 or on the right-hand bearing surface A2, or when increased power is required, providing excitation winding parts and return yokes on both bearing surfaces A1 and A2 after the insertion of the permanent magnet arrangement M or, in particular in the event of unchanged excitation power, to reduce the size of the paired pole shanks and thus to facilitate the access of the permanent magnet arrangement to the axial spacing chamber between the sector stator elements.

We claim:

1. An arrangement for use in a motor or generator, operating according to a reluctance principle, comprising:
   (a) a stator,
      (i) said stator having a plurality of sector stators, said sector stators being distributed around an outer circumference of a rotor and being magnetically, mutually separated, each of said sector stators including:
         (A) a first toothed sector stator element and a second toothed sector stator element, said first toothed stator element being arranged behind said second toothed sector stator element at an axial distance from said second toothed stator element thereby forming an axial spacing chamber, said first and second toothed sector stator elements having common power windings, said first toothed sector stator element ending in a first radially projecting pole shank and said second toothed sector stator element ending in a second radially projecting pole shank, said first radially projecting pole shank being wrapped inside a first excitation winding adapted to excite said first radially projecting pole shank in a first direction, and said second radially projecting pole shank being wrapped inside a second excitation winding adapted to excite said second radially projecting pole shank in a second direction being opposite to said first direction; and
   (b) a permanent magnet arrangement, said permanent magnet arrangement being axially magnetized perpendicular to the polarity of the winding excitations in said sector stator and opposite to a stray field of an exciting field generated by said first and second excitation windings, said permanent magnet arrangement having a yoke arch portion and a second portion, said second portion covering the stator teeth of said first and second toothed sector stator elements, and being provided in said axial spacing chamber between said first and second toothed sector stator elements.

2. The arrangement for use in a motor or generator according to claim 1 wherein, said yoke arch portion and said second portion of said permanent magnet arrangement are included in one piece.

3. The arrangement for use in a motor or generator according to claim 1 wherein, at least one of said first or second toothed sector stator elements has a retaining part, said retaining part preventing said permanent magnet arrangement from falling out of said axial spacing chamber.

4. The arrangement for use in a motor or generator according to claim 2 wherein, at least one of said first or second toothed sector stator elements has a retaining part, said retaining part preventing said permanent magnet arrangement from falling out of said axial spacing chamber.

5. The arrangement for use in a motor or generator according to claim 3 wherein, said retaining part is bent away from a radial end of teeth of said first or second toothed sector stator elements, said retaining part forming a tongue which provides a partial floor beneath said permanent magnet arrangement.

6. The arrangement for use in a motor or generator according to claim 4 wherein, said retaining part is bent away from a radial end of teeth of said first or second toothed sector stator elements, said retaining part forming a tongue which provides a partial floor beneath said permanent magnet arrangement.

7. The arrangement for use in a motor or generator according to claim 1 wherein, said first and second toothed sector stator elements are overlapped by nonmagnetic mounting brackets, said nonmagnetic mounting brackets being connected to at least one of said first and second toothed sector stator elements.

8. The arrangement for use in a motor or generator according to claim 2 wherein, said first and second toothed sector stator elements are overlapped by nonmagnetic mounting brackets, said nonmagnetic mounting brackets being connected to at least one of said first and second toothed sector stator elements.

9. The arrangement for use in a motor or generator according to claim 3 wherein, said first and second toothed sector stator elements are overlapped by nonmagnetic mounting brackets, said nonmagnetic mounting brackets being connected to at least one of said first and second toothed sector stator elements.

10. The arrangement for use in a motor or generator according to claim 4 wherein, said first and second toothed sector stator elements are overlapped by nonmagnetic mounting brackets, said nonmagnetic mounting brackets being connected to at least one of said first and second toothed sector stator elements.

11. The arrangement for use in a motor or generator according to claim 5 wherein, said first and second toothed sector stator elements are overlapped by nonmagnetic mounting brackets, said nonmagnetic mounting brackets being connected to at least one of said first and second toothed sector stator elements.

12. The arrangement for use in a motor or generator according to claim 6 wherein, said first and second toothed sector stator elements are overlapped by nonmagnetic mounting brackets, said nonmagnetic mounting brackets being connected to at least one of said first and second toothed sector stator elements.

13. The arrangement for use in a motor or generator according to claim 1 wherein, said first and second toothed sector stator elements have a radial line of symmetry and said pole shanks are positioned laterally offset from said radial line of symmetry.

14. The arrangement for use in a motor or generator according to claim 13 wherein, said pole shanks are discrete components and said first and second toothed sector stator elements have at least one bearing surface which accommodates at least one of said pole shanks.

15. The arrangement for use in a motor or generator according to claim 14 wherein, said first and second toothed sector stator elements have mirror symmetry with respect to said radial line of symmetry such that said first and second toothed stator sector elements each have two bearing surfaces such that said two bearing surfaces have mirror symmetry with respect to said radial line.

16. The arrangement for use in a motor or generator, operating according to the reluctance principle according to claim 1, further comprising a return yoke connected to said first and second radially projecting pole shanks.

* * * * *